(12) United States Patent
Jones et al.

(10) Patent No.: US 6,397,154 B1
(45) Date of Patent: May 28, 2002

(54) CORRELATION METHOD FOR SURVEILLANCE DEVICE DETECTION

(75) Inventors: Thomas H. Jones; Bruce R. Barsumian, both of Cookeville, TN (US)

(73) Assignee: Research Electronics International, Cookeville, TN (US)

(*) Notice: Subject to any disclaimer, the term of this patent is extended or adjusted under 35 U.S.C. 154(b) by 64 days.

(21) Appl. No.: 09/612,934

(22) Filed: Jul. 7, 2000

(51) Int. Cl.[7] ............... G06F 19/00; G01R 23/00; H04B 17/00
(52) U.S. Cl. ............... 702/57; 702/75; 702/77; 455/67.2
(58) Field of Search ............ 702/56–57, 75–77, 702/189–191; 455/67.2, 67.3, 228; 381/56–58, 71.9, 71.12, 71.14; 708/400, 403–405; 375/340, 342–343

(56) References Cited

U.S. PATENT DOCUMENTS

| 5,241,699 A | | 8/1993 | Barsumian |
| 5,416,844 A | * | 5/1995 | Nakaji et al. ............... 381/71.4 |
| 5,426,703 A | * | 6/1995 | Hamabe et al. ........... 381/71.12 |
| 5,717,656 A | | 2/1998 | Dourbal |
| 5,910,993 A | * | 6/1999 | Aoki et al. ................... 708/322 |
| 5,956,318 A | * | 9/1999 | Saeki ........................... 375/327 |
| 6,018,689 A | * | 1/2000 | Kumura et al. ............. 702/191 |

FOREIGN PATENT DOCUMENTS

DE 24 28 299 2/1976

\* cited by examiner

*Primary Examiner*—Bryan Bui
(74) *Attorney, Agent, or Firm*—Luedeka, Neely & Graham, P.C.

(57) ABSTRACT

A new correlation process and implementing apparatus for use in detecting the presence and location of a concealed eavesdropping device is disclosed in the present application. The process correlates a demodulated intercepted signal with a reference signal that corresponds to the sounds present in an environment of interest. A high correlation between the demodulated intercepted signal and the reference signal indicates that the demodulated intercepted signal corresponds to the audio in the environment of interest. An improved Correlation process is implemented using Fast Fourier Transforms to calculate a figure of merit based upon correlation data determined from sampled versions of the reference and intercept signals. The improved process and apparatus further provides a range to the detected surveillance device and multiple range measurements may be used to triangulate on the surveillance device to determine its precise location.

35 Claims, 4 Drawing Sheets

CORRELATION METHOD FOR SURVEILLANCE DEVICE DETECTION

FIELD OF THE INVENTION

The present invention is directed toward an apparatus and method for detecting the presence of concealed eavesdropping devices. More particularly, the present invention relates to a method and apparatus for correlating a detected signal with a reference signal in order to determine the presence of a concealed eavesdropping device.

BACKGROUND OF THE INVENTION

Many devices and methods are available today for detecting the presence of concealed surveillance device. One such method of attempting to detect a surveillance device is to detect the transmitted signals from an eavesdropping device present in a location and compare a demodulated transmitted signal to a reference signal, which is related to the ambient audio in the environment. If there is a strong correlation between the reference signal and the detected signal, there is a good probability that the detected signal is the result of a hidden eavesdropping device. Thus, a strong correlation between the two signals typically indicates the presence of a covert eavesdropping device that is transmitting a representation of the audio in a room to a remote location. The method of transmission from the eavesdropping device may include a wide variety of transmission medium such as electromagnetic radiation (from radio frequency broadcasts to optical transmission media such as infrared, visible, ultraviolet, LASER, etc.) to hardwired methods (such as dedicated lines, telephone lines, power lines, or any other existing wiring in an environment).

There are prior art methods for performing eavesdropping device detection. One such method of detecting an eavesdropping device is disclosed in U.S. Pat. No. 5,241,699 which is assigned to Research Electronics, Inc. and which is hereby incorporated by reference. This method relies on a phase correlator. The main drawback of a phase correlator is that it does not consider the phase distortions and time delays that result from the speed of sound and echoes from within the environment. Furthermore, it has the drawback that the phase correlator works very well for a continuous audio tone with a constant phase, but works poorly if the audio source has a very wide bandwidth with little continuous tone content.

There are also some prior art correlation methods that rely on basic mathematical cross-correlation and auto-correlation methods. In German patent application No. 24 28 299 February 1976 (Wächtler), there is disclosed a system for detecting eavesdropping transmitters using a cross correlation between a reference audio signal and a demodulated version of a detected transmission. In U.S. Pat. No. 5,717,656 February 1998 (Dourbal) and Russian patent No. 94025549/09 August 1995 (Dourbal), there is disclosed a method for detecting eavesdropping transmitters using cross correlation and autocorrelation functions. These patents by Dourbal (US and Russian) also include a method for detecting the range to the eavesdropping device. However, these prior art correlation methods suffer from a number of drawbacks. For example, the prior art devices utilize basic cross-correlation to determine the correlation between the reference signal and the detected signal. However, basic cross-correlation only provides a resulting correlation number. This number simply indicates that the signals are, or are not, correlated. Thus, basic cross-correlation and auto-correlation techniques do not provide robust resultant information about the relationship between the signals because these prior art correlation techniques do not work well in large rooms with large time delays and phase distortions resulting from echoes. Furthermore, the prior art correlation techniques that incorporate a ranging function or locating function have some drawbacks. First of all, the prior art basically relies on measuring the timed response of the initiation of a known sound source and comparing the time of arrival difference between the reference signal and the intercept signal. This method of range determination also does not work well in large rooms with large time delays and phase distortions resulting from echoes. Therefore, the cross-correlation of the prior art is deficient in a number of respects. Furthermore, all known prior art correlation methods fail to provide the ability to evaluate the frequency response of the intercepted signal and/or the reference audio signal and to automatically introduce a filtering capability into the correlation process to improve upon the correlation data and range finding capabilities of the process.

Yet another problem with prior art devices is that the correlation methods utilized are highly dependent upon unpredictable signal and noise amplitude levels in the room. Thus, it may be necessary to introduce particular types of reference audio into the room in order for the prior art correlation methods to provide any type of useful results. However, producing unusual noises in the room may tip off a third party that is monitoring the room that a detection attempt is being made. This information may result in the third party turning off the surveillance device and frustrating any attempts to locate the device. Thus, the prior art correlation methods create a risk of detection by alerting a third party operating the surveillance device.

Therefore, in view of the above discussed deficiencies in the prior art, what is needed is an advanced correlation method and apparatus which require few mathematical calculations to implement. The invention should not require the introduction of an easily detectable noise source into the room to be scanned. In addition, the correlation method and apparatus should allow the user to determine the surveillance device's location.

SUMMARY OF THE INVENTION

The present invention overcomes the above discussed deficiencies of the prior art by providing a new correlation method which is implemented using discrete Fourier transforms. One skilled in the art will appreciate that discrete Fourier transforms are utilized when dealing with sampled data. While there are many discrete Fourier transform algorithms, the preferred embodiment of the invention utilizes a Complex Fast Fourier Transform to minimize the required calculations. In addition, the data sets calculated are preferably normalized after each Fourier transform process to ensure that the amplitude levels of the data sets do not affect the resulting correlation data. This process is referred to as Fast Correlation.

In particular, the preferred embodiment of the present invention is directed toward a method for detecting the presence of an electronic eavesdropping device that is generating a transmission signal corresponding to sounds in an environment. In accordance with the method, ambient sounds in the environment are detected. Alternatively, a sound source may be generated to produce ambient sounds that would be non-alerting to any third party that may be eavesdropping on the environment. A reference signal corresponding to the ambient sounds in the environment is then generated. An intercept signal corresponding to a detected transmission signal present in the environment is also generated. The reference signal and the intercept signal are sampled to produce sampled reference signal data and sampled intercept signal data. The reference signal is then compared to the intercept signal to determine if an electronic eavesdropping device is present in the environment by performing a fast correlation process on the sampled data.

The preferred embodiment of the invention utilizes a fast correlation process that includes the taking of a Fourier Transform of the sampled reference signal data and an Inverse Fourier Transform of the sampled intercept signal data. The Inverse Fourier Transform of the sampled intercept signal data and the Fourier Transform of the sampled reference data are multiplied to produce product data. The resulting product data is a frequency representation of the correlation of the reference signal and the intercept signal. This product is then filtered by multiplying the product by a weighting function. The simplest weighting function would be one that simply zeroes the frequencies of no interest. The Inverse Fourier Transform of the product data is taken to produce the fast correlation data. The resulting fast correlation data is graphed to provide a graphic display of the correlation between the original two sets of data for all possible time shifts within the sampled time window.

It is important to note that while the preferred embodiment utilizes an Inverse Fourier transform of the sampled intercept data, there are other mathematical approaches to address the correlation process described in the present invention. For example, the Inverse Fourier transform of the sampled reference data could be taken instead of the Inverse Fourier transform of the sampled intercept data. In this case, the resulting correlation data will be reversed. Alternatively, either data set could simply be reversed and basic Fourier transforms could be implemented for the initial Fourier transform process. Yet another approach is to utilize a known audio sound source and have a reference data set that is stored in memory for use in the correlation process. This process is referred to as fast convolution. The major difference between fast correlation and fast convolution is the data reversal of one of the initial sets being evaluated. The correlation process has a data reversal which is implemented in this invention using an Inverse Fourier transform to minimize steps while the convolution process has no data reversal.

The above discussed embodiment improves upon the prior art in a number of respects. For example, the method provides correlation data that has a large number of data points that provide additional information concerning the compared signals as opposed to a single correlation number. In particular, this correlation data gives the correlation between the two sets of sampled data for all possible time shifts. This approach therefore addresses and takes advantage of the echoes and phase shifts that uniquely occur in various environments due to the size, shape, and interior contents of the environment of concern. Furthermore, the above method results in a set of correlation data that assumes a periodic nature of the sampled signals. This is advantageous in that the resultant correlation data provides information corresponding to time shifts in both the negative and positive directions between the two sets of data while keeping the amplitude level independent of the number of points that are multiplied. The fast correlation method provides this improved correlation data for all possible time shifts while requiring many less calculations than the prior art methods.

In other alternative embodiments of the present invention, zero padding techniques are used in the fast correlation process to increase resolution of the resultant correlation data. This approach is implemented by increasing the sample size of the reference and intercept signals by simply adding zero value samples to the data sets. These zero value samples can be added to the original sampled data sets prior to any processing to increase the frequency spectrum resolution. Or, zero value samples can be added to the filtered data set prior to taking the final Inverse Fourier transform to increase the range resolution of the final fast correlation data.

The sampled reference signal data and sampled intercept signal data are preferably filtered such that frequencies in a frequency band of interest will be emphasized in the fast correlation process. The filter function parameters for the filtering are automatically determined by analyzing frequency spectrum data from the reference signal and the intercept signal. The filter function can be automatically determined by developing an algorithm that evaluates the Fourier transform of the intercept signal, and then de-emphasizes the portions of the frequency spectrum where the detected eavesdropping device appears to have poor frequency response. This approach further optimizes the correlation process, and is a large improvement over the prior art correlation methods.

The present invention also comprehends a variety of different ways of generating the reference signal. In one such embodiment, the ambient sounds in the environment are measured with a microphone to produce the reference signal. In another embodiment, a telephone signal is received from a telephone line that corresponds to the ambient sounds in the environment sensed by the telephone and the telephone signal is used as the reference signal. In yet another embodiment, an audio signal produced by an audio source is introduced into the environment and an output signal corresponding to the audio signal from the audio source is used as the reference signal. For reasons discussed in more detail below, the audio signal introduced by the audio source into the environment is preferably audio white noise.

The above discussed system improves upon the prior art by providing the ability to correlate on ambient room noises such as air conditioner noise or street noise coming in through a window without the introduction of an audio signal. In addition, the use of an audio source for the reference signal provides an advantage by generating a reference signal that does not contain any echoes or phase distortions resulting from the environment. White noise is preferably utilized because it provides a very broad audio frequency spectrum which compliments the fast correlation process while providing an ambient environment audio source that is non-alerting to a third party because it contains no intelligible audio content. For example, a specialized noise such as a series of beeps might alert a third party listening through the concealed surveillance device that a counter intelligence operation is being undertaken. This knowledge may lead the party operating the surveillance device to turn off the device, thereby frustrating attempts to locate the device. Thus, the ability to locate a surveillance device with a non-alerting audio source such as white noise is a substantial improvement upon the prior art.

Embodiments such as those discussed above which introduce audio signals into the environment of interest allow the fast correlation data to be analyzed to determine a range to a microphone of the electronic surveillance device which can be displayed to a user. The correlation data is graphed in such a manner that a first peak in the graph represents the distance from the audio source to the electronic surveillance device. Furthermore, multiple range measurements may be taken and the location of the electronic surveillance device determined through triangulation based upon the multiple range measurements.

There are also a variety of methods of generating an intercept signal in accordance with the present invention. In one embodiment, electromagnetic signals in the environment are monitored with an electronic receiver that generates an intercept signal that corresponds to the electromagnetic signals in the environment. In another embodiment, electronic signals are received from any miscellaneous lines in the environment such as power lines, telephone lines, LAN lines, or security system wires, and an intercept signal is produced that corresponds to the electronic signals on the lines in the environment. In yet another embodiment, electronic signals are received from a light wave detector. This light wave detector may be capable of infrared, visible, ultraviolet or laser frequencies. Regardless of the method used to intercept the transmission signals, the preferred embodiment of the present invention uses the fast correlation data derived from the intercept and reference signals to calculate a correlation figure of merit such that the value of the correlation figure of merit indicates the presence of an electronic surveillance device. In this preferred embodiment, the figure of merit is calculated by evaluating the statistical characteristics of the resulting fast correlation data. Furthermore, in especially preferred embodiments, the figure of merit is calculated using standard deviation calculations such that the figure of merit is normalized and does not depend upon the signal amplitude levels of the suspected surveillance device signal and the reference signal. In addition, the fast correlation data and the calculated figure of merit data may be integrated to smooth out the resulting data. This is helpful in minimizing any drastic changes that may occur in the results of the correlation process due to rapid changes in the audio spectrum of the environment.

The present invention is also directed toward an apparatus for detecting the presence of a surveillance device in an environment of interest. The apparatus includes a reception device for intercepting transmission signals being generating by an eavesdropping device and producing an intercept signal that corresponds to the demodulated audio from the transmission signal. The apparatus also produces an electric reference signal that corresponds to the sounds propagating through the environment. Samplers simultaneously sample the electric intercept signal and the electric reference signal during a sampling interval to produce digital intercept data and digital reference data for processing.

The preferred apparatus also has a processor. The processor performs an Inverse Fast Fourier Transform on the digital intercept data and a Fast Fourier Transform on the digital reference data to produce transformed intercept data and transformed reference data. The processor may also take the Inverse Fast Fourier Transform of the digital intercept data by reversing the order of data bits in the digital intercept data and taking a Fast Fourier Transform of the reversed order digital intercept data. The product of the transformed reference data and the transformed intercept data is calculated to produce product data. This data can be filtered in order to further improve the correlation process by emphasizing the audio frequencies of interest. This filtering can be implemented separately or incorporated into the functioning of the processor. The Inverse Fast Fourier Transform of the product data is then taken to produce the fast correlation data. The processor produces a graph of the fast correlation data and a display displays the graph to a user. The fast correlation data is then examined to determine if the demodulated audio from the intercepted signal corresponds to the sound propagating through the environment. The preferred apparatus further includes a range determining algorithm that determines a range to the surveillance device based upon the fast correlation data. Alternatively, the range determining algorithm may determine the range to the surveillance device based upon the graph of the fast correlation data. A filter, having filtering parameters selected based on utilizing a specific portion of the audio frequency spectrum for correlation, frequency filters the fast correlation data. Alternatively, the filtering parameters may be automatically determined by the processor based upon a power spectral density of a frequency spectrum of the intercept signal. The processor may perform triangulation calculations to determine the location of the surveillance device through triangulation based upon multiple range determinations.

One advantage of the above discussed method over the prior art is that it has very robust performance in different acoustic environments. The performances of the prior art correlation methods and apparatus are highly dependent upon unpredictable signal levels. However, the preferred embodiment of the present invention is not dependent upon unpredictable signal amplitude levels because all of the signal levels are preferably normalized through out the correlation process and in the figure of merit calculations. Furthermore, the sensitivity of the correlation process described in the present invention depends highly on the amount of time that is sampled to generate the original intercept signal and reference signal. Therefore, the sensitivity of the correlation process can be greatly improved by simply sampling the intercept signal and the reference signal for a longer period of time before implementing the fast correlation process. And, the sensitivity of the correlation process can be further improved by implementing the digital audio filtering process described herein.

As can be seen from the previous discussion, the present invention provides an array of improvements over the prior art. Yet other objects and advantages of the invention will be apparent from the following description, the accompanying drawings and the appended claims.

BRIEF DESCRIPTION OF THE DRAWINGS

Further advantages of the invention will become apparent by reference to the detailed description of the preferred embodiments when considered in conjunction with the following drawings wherein.

DETAILED DESCRIPTION OF THE PREFERRED EMBODIMENTS

As previously discussed, the present application is directed toward an improved apparatus and method for correlating an intercepted signal with a reference signal that corresponds to the ambient sound in an area of interest to determine if an eavesdropping device is present in the area.

The basic principle is that if a demodulated version of the intercepted signal has a high correlation with the reference signal then the intercepted signal contains a modulated version of the audio in the room which is being transmitted to a remote location. Furthermore, by determining a time delay between the reference signal and the intercepted signal and knowing the speed of sound, the range to the eavesdropping device can be determined.

Figure 1:
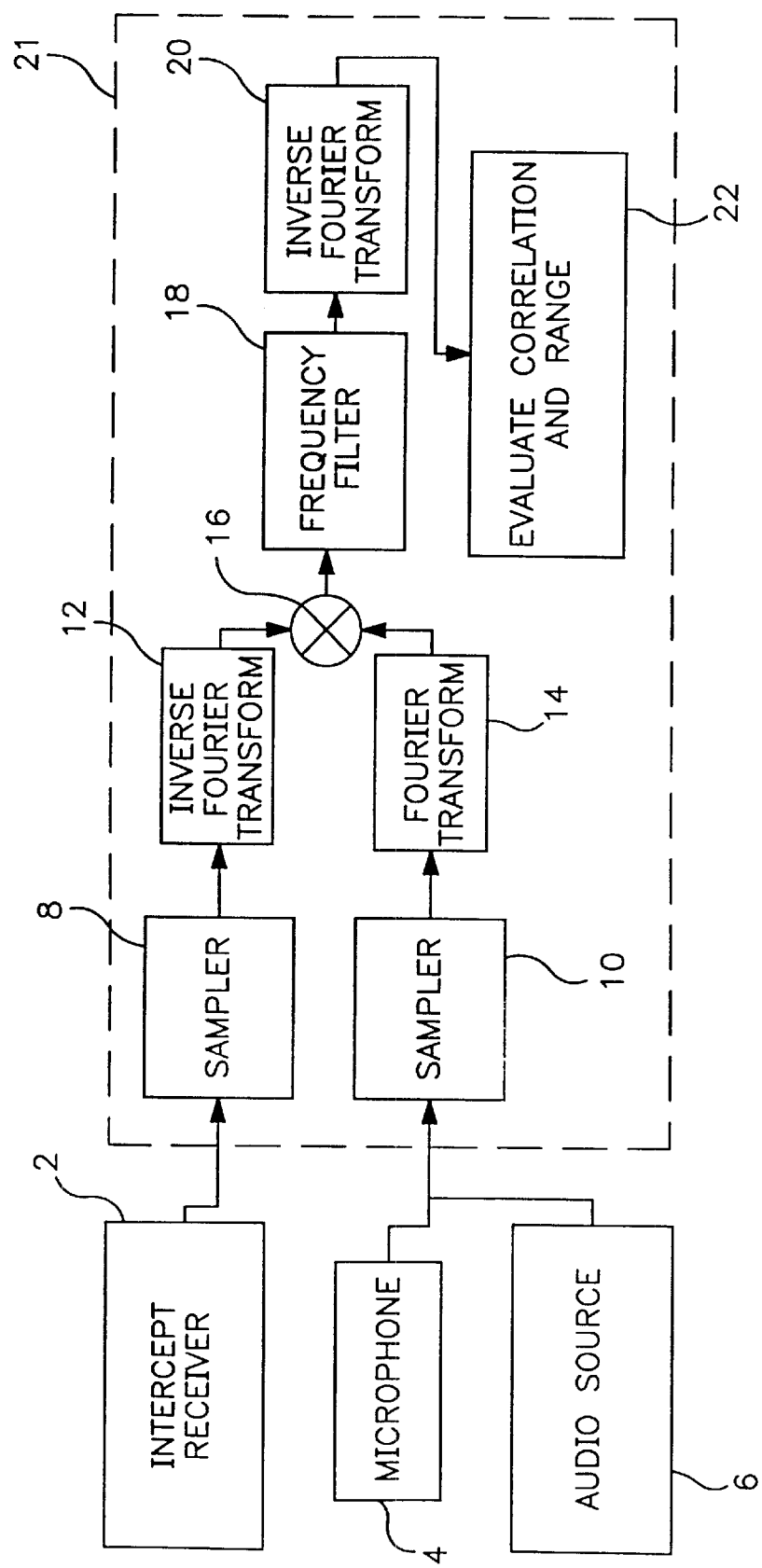
FIG. 1 is a diagram of a preferred embodiment of the Fast Correlation method and apparatus of the present invention.

Referring now to the figures, wherein like reference numerals designate similar or corresponding features, there is shown in FIG. 1 a block diagram of a preferred embodiment of the present invention. In accordance with this preferred embodiment, an intercept receiver 2 monitors the transmission signals in the area of interest and produces an intercepted electric signal that corresponds to the demodulated transmission signals in the area of interest. As previously discussed, the transmission signals may be electromagnetic signals propagating through the area of interest, electronic telephone line signals, power line signals, LAN line signals, security system wiring signals, infrared, visible, ultraviolet or laser frequencies. In the preferred embodiment of the invention, a receiver automatically scans through the electromagnetic spectrum and evaluates each detectable signal using the present invention. Contemporaneously with the receiving of the transmission signals, a microphone 4 receives sounds from the area of interest and produces a reference electric signal that corresponds to the audio in the area of interest.

The audio from the area of interest may be introduced from an audio source 6 into the area of interest. As discussed in more detail below, the provision of an audio source 6 allows the present invention to perform a ranging function. However, the present invention is a substantial improvement over the prior art without the ranging function in that it is capable of correlating on normal ambient room noises such as air conditioner noise or street noise coming in through a window. In a most preferred embodiment, the audio source 6 introduces white noise into the area of interest. White noise is preferable because its presence is unlikely to be detected by a third party which is listening to received audio from the area of interest. This is because any received white noise will be indistinguishable from normal distortion and interference, and white noise contains no intelligible signal. Avoiding detection by the third party is important because if the third party determines that a counter-surveillance operation is being undertaken, the third party may turn off the surveillance device in order to minimize the likelihood that it will be detected. In addition, white noise is beneficial because it provides full spectrum noise at substantially all frequencies of interest.

Referring back to FIG. 1, the intercepted signal is sampled by a sampler 8 to produce digital intercept data. The reference electric signal is also sampled by a sampler 10 to produce digital reference data. Preferably, the sampling of the intercept electric signal is performed substantially simultaneously with the sampling of the reference signal. Thus, the digital intercept data corresponds to the demodulated transmission signals, such as electromagnetic radiation, which are propagating in the area of interest during the same time period that the digital reference data corresponds to the received audio in the area of interest. Block 12 depicts the performing of an Inverse Complex Fast Fourier Transform on the digitally encoded intercept data, while Block 14 depicts the performing of a Complex Fast Fourier Transform on the digitally encoded reference data. A Fast Fourier Transform is a mathematical procedure for calculating a Fourier Transform that employs the Cooley-Tukey algorithm to reduce the number of operations necessary to calculate the Fourier transform. In particular, the most preferred form of Fast Fourier Transform utilized by the present invention is a radix 2 type Fast Fourier Transform.

In the preferred embodiment depicted in FIG. 1, an inverse Fast Fourier Transform is performed on the digital intercept data from the sampler 8 in block 12. When referring to digital data, an Inverse Fourier Transform can be obtained by simply reversing the order of the digital bits in the data stream and performing a Fourier Transform on the reversed data. Regardless of how the Fast Fourier Transforms are performed, the inverse transformed intercept data from block 12 and the transformed reference data from block 14 are multiplied together by the multiplier 16. The multiplier 16 simply multiplies, on a sample by sample basis, all of the data in the two sampled data sets to produce a single set of data.

The multiplied resultant data from the multiplier 16 is then filtered by a frequency filter 18. The frequency filter 18 preferably applies bandpass filtering to the resultant data. With digital data, filtering may be accomplished by simply zeroing the undesired frequencies. Different bandpass filtering schemes may be implemented by the frequency filter 18 to optimize the desired mode of operation. For example, the digital data may be multiplied by a weighting function such as a Kaiser Window, Hamming Window, or Gamma distribution to produce a desired band-pass or smoothing response. Furthermore, the bandpass filtering parameters may be automatically determined based on the power spectral density of the frequency spectrum of the reference signal. In embodiments which incorporate a ranging function, the filtering parameters may be selected manually or automatically based on the desired range resolution. The Inverse Fast Fourier Transform of frequency filtered resultant data is taken in block 20. Taking the Inverse Fast Fourier Transform produces correlation data which can be evaluated in Block 22 to determine relationships between the intercepted and reference signals. The functions performed by the elements in blocks 8, 10, 12, 14, 16, 18, 20 and 22 may be performed by a standard computer 21 having a display and input ports. In the preferred embodiment of the invention, the resulting correlation data is squared so that the resulting graph will contain only positive values and the peaks of the graph can be easily evaluated. In particular, the above discussed correlation process results in a graph that is directly related to time delays between the audio content in the intercepted signal and the reference signal if a bugging device is present. Due to the speed of sound and the echoing audio reflections from the room dimensions, this resulting data has some unique characteristics. In particular, the known speed of sound may be used to convert the graph into range data. For example, if the sample time of the intercepted signal and the reference signal is one half second, the resulting graph will have an associated range of 550 ft. This is determined by multiplying the speed of sound per second (1100 feet/sec) times the number of seconds (0.5). In addition, the range resolution can be determined by dividing the speed of sound (1100 ft) by the sampling rate of the data (8000 Hz). Thus, for the given example, the range resolution would be 1.6 inches (1100 ft)(12 inches per ft)/(8000 Hz).

The graph of the correlation data also has some additional properties which can be useful in locating a hidden surveillance device. For example, if a reference noise source is used and the reference noise source is closer to reference audio receiver 4 than it is to the surveillance device receiver, the reference signal and the intercept signal will correlate on the left hand portion of the graph. Conversely, if the reference noise source is closer to the surveillance device receiver than it is to the reference audio receiver, the reference signal and the intercept signal will correlate predominately on the right hand portion of the graph. Thus, information concerning the location of the surveillance device can be determined by simply examining the graph. A graph with peaks at either end of the graph will indicate the presence of a surveillance device, while a graph with random peaks throughout the graph indicates no correlation.

In any location, echoes are created from sounds bouncing off objects and boundaries. Because of these echoes, time delayed versions of ambient sounds received directly from a noise source will also be received by a receiver. These echoes diminish after a period of time that is directly related to the dimensions and audio characteristics of a room. Thus, if there is a bugging device present, at least one of the left portion and the right portion of the above discussed graph will contain relatively high correlation values. However, the center portion of the graph will typically be minimal due to the decreasing amplitude levels of the echoes and reflections.

Figure 2:
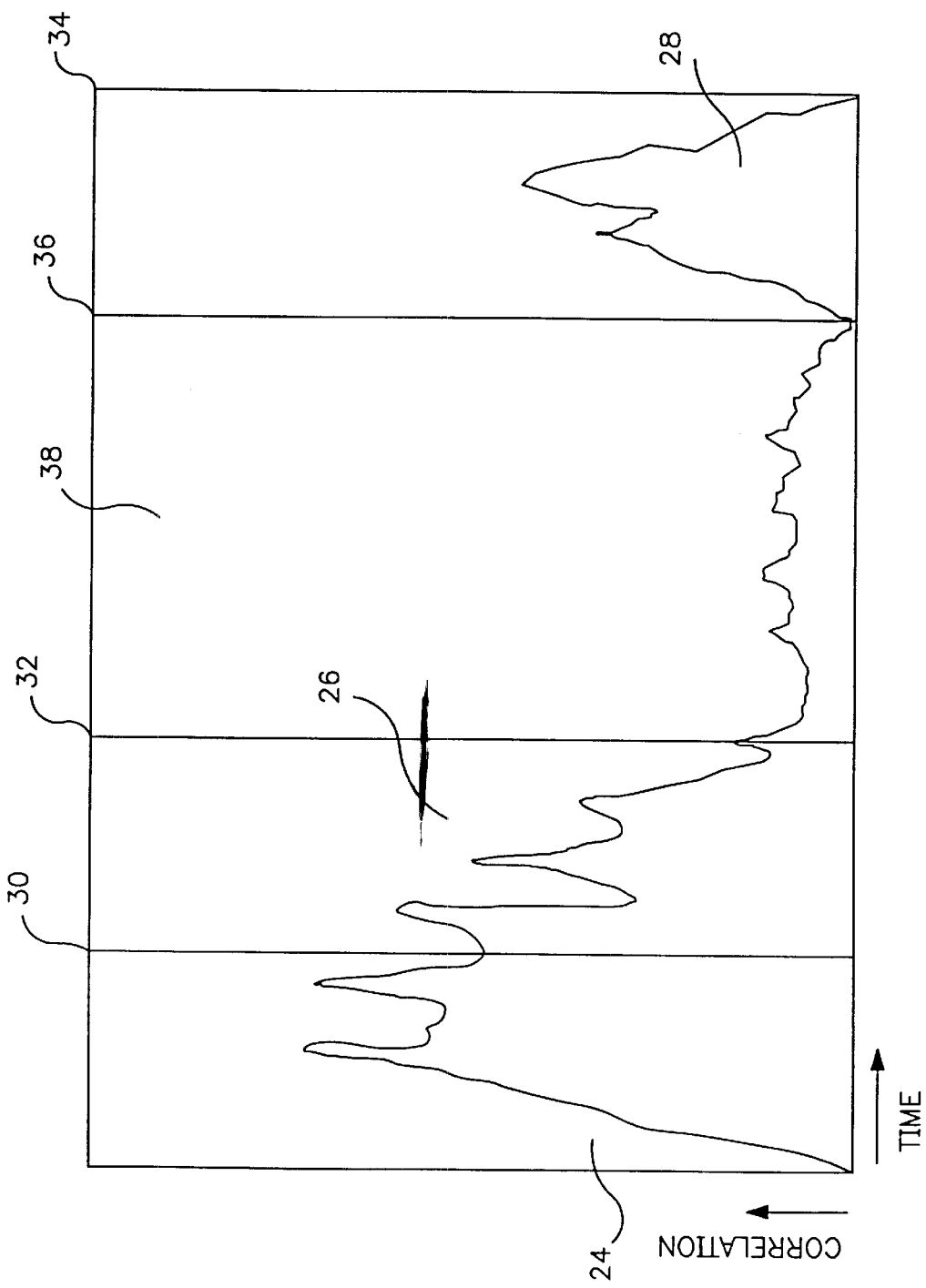
FIG. 2 is a graphical representation of correlation data determined in accordance with the improved correlation process of the present invention.

By evaluating the graph of the resulting data from the correlation process it is possible to develop many different figures of merit for correlation based on the shape of the correlation graph. In this mode of operation, if the reference audio input is an external microphone, then the graph of the correlation process may have peaks at both the left and right side of the graph depending upon the location of the ambient noise sources in the environment relative to the reference microphone and the eavesdropping device. However, if the reference audio is an audio source that is being played in the room and fed directly into the correlation process, then the graph will have correlation data on only the left side of the graph because there are no time delays or echoes associated with the reference signal. In FIG. 2, a chart is utilized to explain the correlation results of this system and the preferred mode of calculating a correlation figure of merit. It should be noted that, in a typical situation, the bug detection equipment is placed in the center of the room to be searched. However, the location of any potential surveillance device is obviously unknown. In FIG. 2, region 24 represents the correlation of audio in the room with the audio source placed closer to the reference audio input than the surveillance device audio input. The boundary to region 24 represents the time required for sound to travel to the maximum room dimension 30. Region 26 represents the correlation of the echoes associated with the audio source. The boundaries of region 26 are the time for sound to travel the maximum room dimension 30 and the time required to travel to twice the maximum region dimension 32. Region 28 represents the correlation of the audio in the room when the audio source is closer to the surveillance device's receiver than the reference audio input. The boundaries of the region 28 are the maximum sample time 34 and the maximum sample time minus the time required for sound to travel the maximum room dimension 36. Region 38 represents the correlation of multiple echoes.

Having defined regions of interest 24, 26 and 28 in the correlation data graph, we can now define a correlation figure of merit. In this embodiment, we define the correlation figure of merit as follows:

Correlation Figure of Merit=((standard deviation of data from regions 24, 26 and 28)−(standard deviation of region 38))/(standard deviation of region 38)

Using the above described correlation figure of merit, it is possible to make predictions about the presence of a surveillance device. In particular, if the above discussed correlation figure of merit is close to zero or negative, there is most likely not a bug present. However, if the correlation figure of merit is strongly positive, a bug is most likely present. While the above discussed correlation figure of merit is preferred, a variety of different figures of merit could be devised to characterize the graph of the correlation data in a useful manner. The particular figure of merit described above is particularly useful in that it is independent of the amplitude levels of the sampled signals. This is important because it is nearly impossible to predict the amplitude levels of the reference signal and the intercept signal. Thus, it is very difficult to predict the amplitude levels of the resulting correlation graph. For instance, it is impossible to precisely predict the volume level of the ambient sound in the environment of interest. In addition, it is impossible to precisely predict the frequency spectrum of the audio in the room and the bandpass filtering process may greatly affect the resulting graph's amplitude spectrum. The above discussed figure of merit is not dependent upon unpredictable signal amplitude levels because all of the signal levels are normalized by the standard deviation calculations used in the figure of merit calculation.

Yet another preferred embodiment of the present invention incorporates a ranging and locating function that allows a user to determine the location of the surveillance device identified by the above discussed correlation process. The ranging process requires the introduction of an audio source into the environment of interest. Preferably the audio source is an external audio source such as a stereo, compact disc player, or white noise generator 6 such as shown in FIG. 1. The preferred embodiment further contemplates wiring the output of the audio source directly into the correlation process as opposed to using a microphone to generate the reference audio input. The provision of an audio source allows the present invention to locate the surveillance device by taking into account the speed of sound and the time delay between the production of the sound at the audio source and the retransmission by the surveillance device of the signal corresponding to the sound in the environment.

Figure 3:
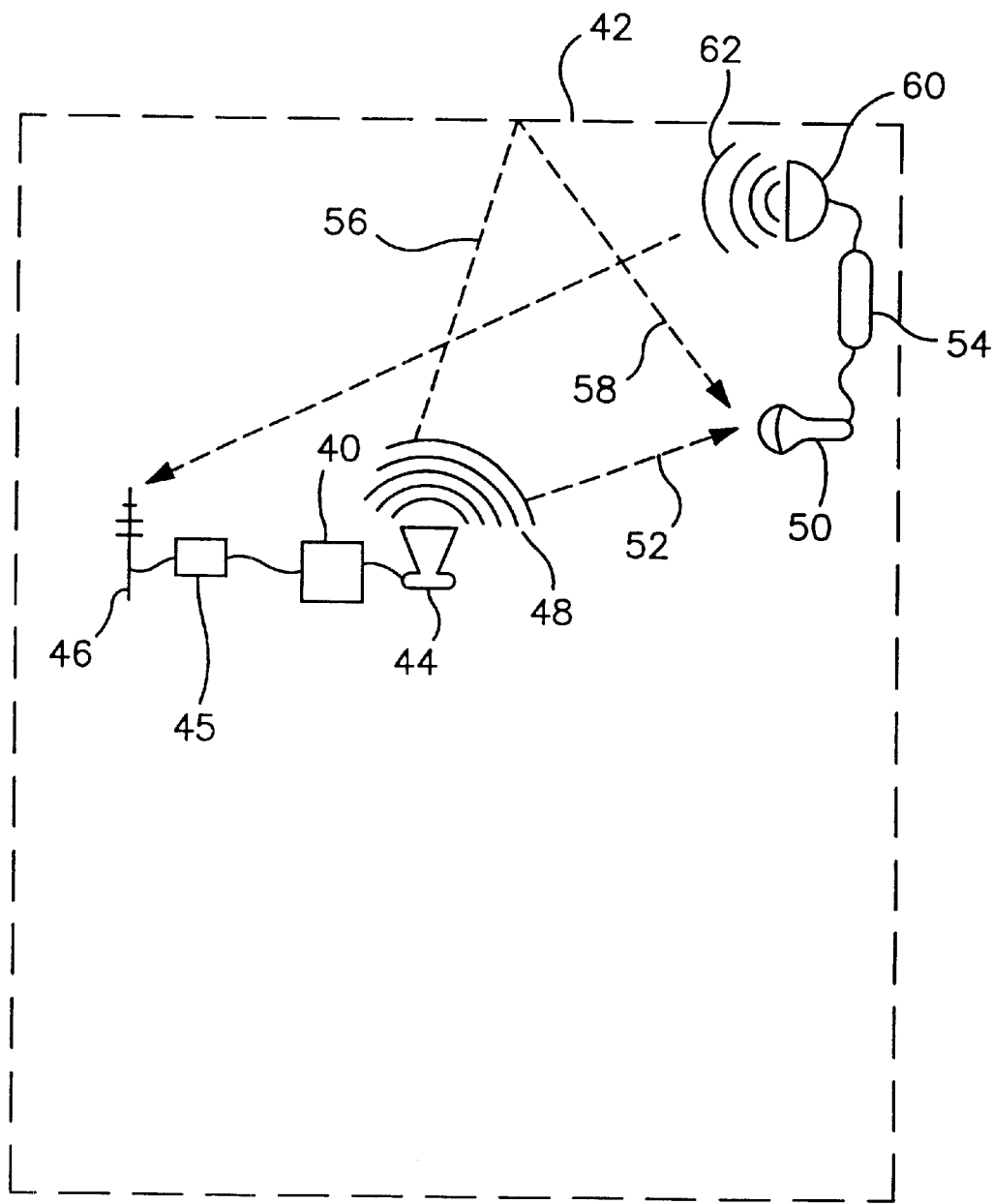
FIG. 3 depicts an apparatus in accordance with the present invention and its implementation to detect a concealed surveillance device.

Referring now to FIG. 3, a preferred embodiment of the present invention depicting the ranging concept in conjunction with electromagnetic intercept signal is shown in more detail. While the intercept signal may be generated using a variety of reception devices, FIG. 3 utilizes a radio frequency transmitting device and a radio frequency receiver for exemplary purposes. The process begins by placing an embodiment 40 of the present invention within a room 42. The embodiment is equipped with an audio source 44 and an antenna 46. The ranging process begins by producing an audio signal from the audio source 44 which propagates through the room 42. The first portion 52 of the audio signal 48 to reach the microphone 50 of the surveillance device 54 is the portion which travels directly from the audio source 44 to the microphone 50. Other portions 56 of the audio signal 48 are reflected from the boundaries of the room 42 and then received by the microphone 50 as echoes 58. These echoes 58 arrive at the microphone 50 later than the direct signal 52. In addition, the echoes 58 have attenuated and are smaller in amplitude than the directly received audio signal 52.

Once the surveillance device 54 has picked up audio signals on the microphone 50, it retransmits them as electromagnetic signals 62 from a transmitting antenna 60 which is remotely monitored by the third party which placed the surveillance device 54 in the room 42. The embodiment of FIG. 3 also has a receiving antenna 46 and a receiver 45 which receive and demodulate the electromagnetic radiation, such as an electromagnetic signal 62, that is propagating through the room 42. The receiving antenna 46 receives electromagnetic signals 62 corresponding to the audio signals 48 an undetermined amount of time after the audio signals 48 were transmitted by the audio source 44. The length of this time delay depends upon the time required for sound to travel distance between the audio source 44 and the microphone 50, the delay between the time the surveillance device 54 receives the audio signals 48 with the microphone 50 and the time the transmitting antenna 60 retransmits signals 62 corresponding to the audio signals 48, and the time required for the transmitted signals 62 to reach the receiving antenna 46. Because of the high speed of modern electronics, and the high speed at which electromagnetic radiation or similar transmission signals propagate, the time delay between the sending of the audio signals 48 and the receiving of the electromagnetic signals 62 is almost entirely a function of how long it takes sound to travel between the audio source 44 and the microphone 50. Since the speed of sound is relatively constant, the distance between the audio source 44 and the microphone 50 can be accurately determined.

Figure 4:
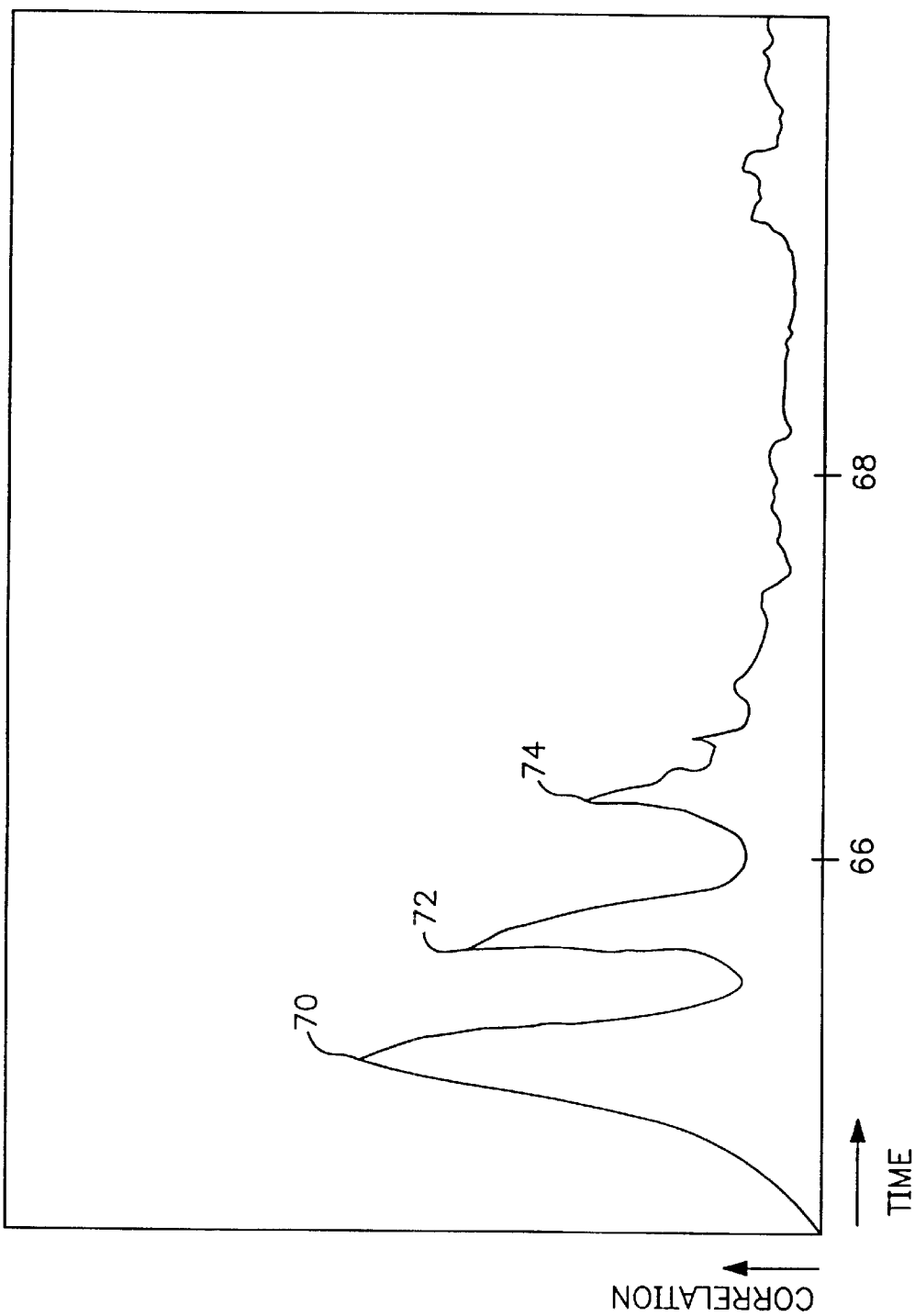
FIG. 4 is a graphical representation of correlation data calculated in accordance with the improved correlation process and its use to determine a range to a concealed surveillance device.

Referring now to FIG. 4, a graph of a correlation data such as would be produced by the embodiment 40 shown in FIG. 3 is depicted. The graph of FIG. 4 is basically a graph of correlation versus time. As discussed with respect to FIG. 1, the first boundary mark 66 preferably corresponds to the amount of time required for sound to travel the maximum room dimension. For example, if we assume that the graph of FIG. 4 represents the correlation data from the embodiment 40 shown in FIG. 3 and that the maximum distance from the audio source 44 in FIG. 3 to any point within the room 42 is 30 feet, the first boundary mark 66 will be at the maximum room dimension (30 feet) divided by the speed of sound (1100 feet/sec). Thus, the first boundary mark is at 0.027 seconds. The second boundary mark 68 is placed at the time required for sound to travel twice the maximum room dimension or 0.054 seconds. This second boundary mark 68 is selected simply because the amplitude level of the audio echoes greatly diminishes after echoes, and it is impossible to predict the reflection coefficient of the audio echoes because the structure of the environment's walls cannot be predicted.

Looking at the graph of FIG. 4, it is possible to determine the distance between the audio source and the microphone of a surveillance device. This distance is represented in FIG. 4 by the time delay to the first large peak 70. This first correlation peak 70 indicates the most direct path from the audio source 44 to the surveillance device 54. The subsequent correlation peaks 72 and 74 will be associated with the attenuated sound echoing around the environment and arriving at the bugging device with some latency. By simply multiplying the time delay to the first peak 70 by the speed of sound, the distance to the surveillance device 54 can be accurately determined. For example if the time to the first peak 70 is 0.015 seconds, the range to the electronic surveillance device is, 0.015 seconds×1100 feet/second, or 16.5 feet.

The ability to determine a range to a target allows one to determine the location of the target through a process known as triangulation. In order to accomplish this triangulation, the ranging process of the present invention must be repeated for at least three different measurement points. The range measurements are taken by placing the audio source 44 in three pre-defined positions and taking measurements. In the preferred embodiment, these measurement points are referred to as the left, right and center measurement points. From these range measurements, the preferred embodiment performs the calculations needed to triangulate on the location of the surveillance device 54. The location of the surveillance device 54 is then preferably provided to a user of the present invention in the form of a three dimensional set of coordinates, or a distance and an azimuth angle, specifying the distance and direction to the surveillance device 54.

Many substantial improvements in the prior art are embodied in the present invention. Thus, while specific embodiments of the invention have been described with particularity above, it will be appreciated that the invention comprehends rearrangement and substitution of parts within the spirit of the appended claims.

What is claimed is:

1. A method for detecting the presence of an electronic eavesdropping device that is transmitting a signal corresponding to ambient sounds in an environment, the method comprising:

generating a reference signal corresponding to the ambient sounds in the environment;

generating an intercept signal corresponding to demodulated audio from the transmitted signal of the electronic eavesdropping device present in the environment;

sampling the reference signal and the intercept signal to produce sampled reference signal data and sampled intercept signal data;

comparing said reference signal to said intercept signal to determine if an electronic eavesdropping device is present in said environment by performing a fast correlation process on the sampled data of intercept signal and reference signal to produce fast correlation data.

2. The method of claim 1 wherein said fast correlation process comprises:

reversing a data order of one of said sampled reference signal data and said sampled intercept signal data;

taking a Fourier Transform of said sampled reference signal data;

taking a Fourier Transform of said sampled intercept signal data;

multiplying the Fourier Transformed sampled intercept signal data and the Fourier Transformed sampled reference data to produce product data; and taking the inverse Fourier transform of the product data to produce fast correlation data.

3. The method of claim 1 wherein said fast correlation process comprises:

taking a Fourier Transform of one of said sampled reference signal data and said sampled intercept signal data and taking an Inverse Fourier Transform of the other of said sampled reference signal data and said sampled intercept signal data;

multiplying the transformed sampled intercept signal data and the transformed sampled reference data to produce product data; and taking the inverse Fourier transform of the product data to produce fast correlation data.

4. The method of claims 2 or 3 wherein Fast Fourier transform algorithms are used for the Fourier transform processes.

5. The method of claim 1 further comprising the step of filtering one of the sampled reference signal data, sampled intercept signal data and product data such that the frequencies in a frequency band of interest are emphasized in the fast correlation process.

6. The method of claim 5 wherein filter function parameters for the filtering are automatically determined by analyzing frequency spectrum data from the reference signal and the intercept signal.

7. The method of claim 1 wherein generating a reference signal corresponding to the ambient sounds in the environment further comprises measuring the ambient sounds in the environment with a microphone that produces the reference signal.

8. The method of claim 1 wherein generating a reference signal corresponding to the ambient sounds in the environment further comprises receiving a telephone signal from a telephone that corresponds to the ambient sounds in the environment sensed by the telephone and using said telephone signal as said reference signal.

9. The method of claim 1 wherein said transmitted signal corresponds to some portion of the electromagnetic spectrum such as radio frequency, infrared, visible light, ultraviolet, and lasers.

10. The method of claim 1 wherein said transmitted signal is being transmitted on wires such as power lines, telephone lines, LAN lines and security system wires which are found in the environment.

11. The method of claim 1 wherein generating a reference signal corresponding to the ambient sounds in the environment further comprises introducing an audio signal produced by an audio source into the environment and using an output signal corresponding to said audio signal from said audio source as said reference signal.

12. The method of claim 11 further comprising analyzing said fast correlation data to determine a range to a microphone of said electronic eavesdropping device.

13. The method of claim 12 further comprising displaying said range.

14. The method of claim 13 further comprising determining multiple range measurements and determining the location of said electronic eavesdropping device based upon said multiple range measurements.

15. The method of claim 11 further comprising graphing said fast correlation data such that a first peak in said graph represents the distance from said audio source to said electronic eavesdropping device.

16. The method of claim 1 further comprising integrating said fast correlation data.

17. The method of claim 1 further comprising using said fast correlation data to calculate a correlation figure of merit wherein a range of values of said correlation figure of merit indicates the presence of an electronic eavesdropping device.

18. The method of claim 17 further comprising integrating said figure of merit.

19. The method of claim 17 wherein said figure of merit is calculated using standard deviation calculations such that said figure of merit is normalized and does not depend upon signal amplitude levels of said suspected eavesdropping device signal and said reference signal.

20. The method of claim 1 wherein zero padding is utilized in the fast correlation process to increase the resolution of the resulting correlation data.

21. The method of claim 1 further comprising squaring said fast correlation data such that said fast correlation data is positive for analysis.

22. An apparatus for detecting the presence of an eavesdropping device in an environment of interest, said apparatus comprising:

a transmitted signal receiver for intercepting transmitted signals in said environment of interest and producing an electronic intercept signal corresponding to said transmitted signals in said environment;

a reference signal generator for producing an electronic reference signal corresponding to said sound propagating through said environment;

a sampler for sampling said electronic intercept signal and said electronic reference signal during a sampling interval and producing digital intercept data and digital reference data; and a processor for comparing said reference signal to said intercept signal to determine if an electronic eavesdropping device is present in said environment by performing a fast correlation process on said digital reference data and said digital intercept data to produce fast correlation data.

23. The apparatus of claim 22 wherein said processor further comprises processing means for:

taking a Fourier Transform of one of said digital reference data and said digital intercept data and taking an Inverse Fourier Transform of the other of said digital reference data and said digital intercept data;

multiplying the transformed digital intercept data and the transformed digital reference data to produce product data; and taking the inverse Fourier transform of said product data to produce fast correlation data.

24. The apparatus of claim 22 wherein said processor further comprises processing means for:

reversing a data order of one of said digital reference data and said digital intercept data;

taking a Fourier Transform of said digital reference data and said digital intercept data;

multiplying the transformed digital intercept data and the transformed digital reference data to produce product data; and taking the inverse Fourier transform of said product data to produce fast correlation data.

25. The apparatus of claims 23 or 24 wherein Fast Fourier transform algorithms are used for the Fourier transform processes.

26. The method of claim 22 wherein said reference signal generator further includes a microphone for producing a reference signal corresponding to ambient sounds in the environment.

27. The apparatus of claim 22 wherein said reference signal generator further comprises an audio source for introducing an audio signal into said environment.

28. The apparatus of claim 27 further comprising a range processing means for determining a range to said eavesdropping device based upon said fast correlation data.

29. The apparatus of claim 28 further comprising a triangulation processing means for determining the location of said eavesdropping device through triangulation based upon multiple range determinations.

30. The apparatus of claim 28 further comprising a filter for frequency filtering said fast correlation data wherein filtering parameters of said filter are selected based upon a desired range resolution.

31. The apparatus of claim 22 further comprising a filter for frequency filtering said fast correlation data wherein filtering parameters of said filter are selected based upon a desired audio frequency spectrum correlation.

32. The apparatus of claim 22 further comprising a filter having filtering parameters wherein said filtering parameters are automatically determined by said processor based upon a power spectral density of a frequency spectrum of said reference electronic signal.

33. The apparatus of claim 22 further comprising graph processing means for producing a graph of said correlation data and a display for displaying said graph.

34. The apparatus of claim 33 further comprising range determining processing means wherein said range determining processing means determine a range to said eavesdropping device based upon said graph.

35. The apparatus of claim 22 further comprising a receiver for automatically scanning through multiple frequencies of concern, to detect signals of interest and to evaluate these signals of interest using the fast correlation process.

* * * * *